J. HUDSON.
TRACE-CARRIER.
No. 172,022. Patented Jan. 11, 1876.
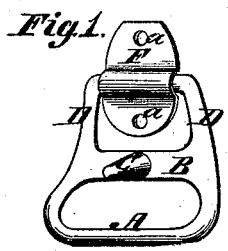
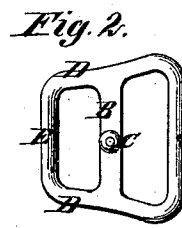
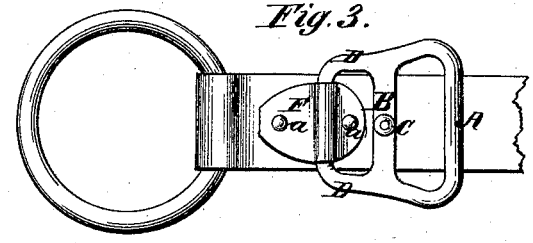
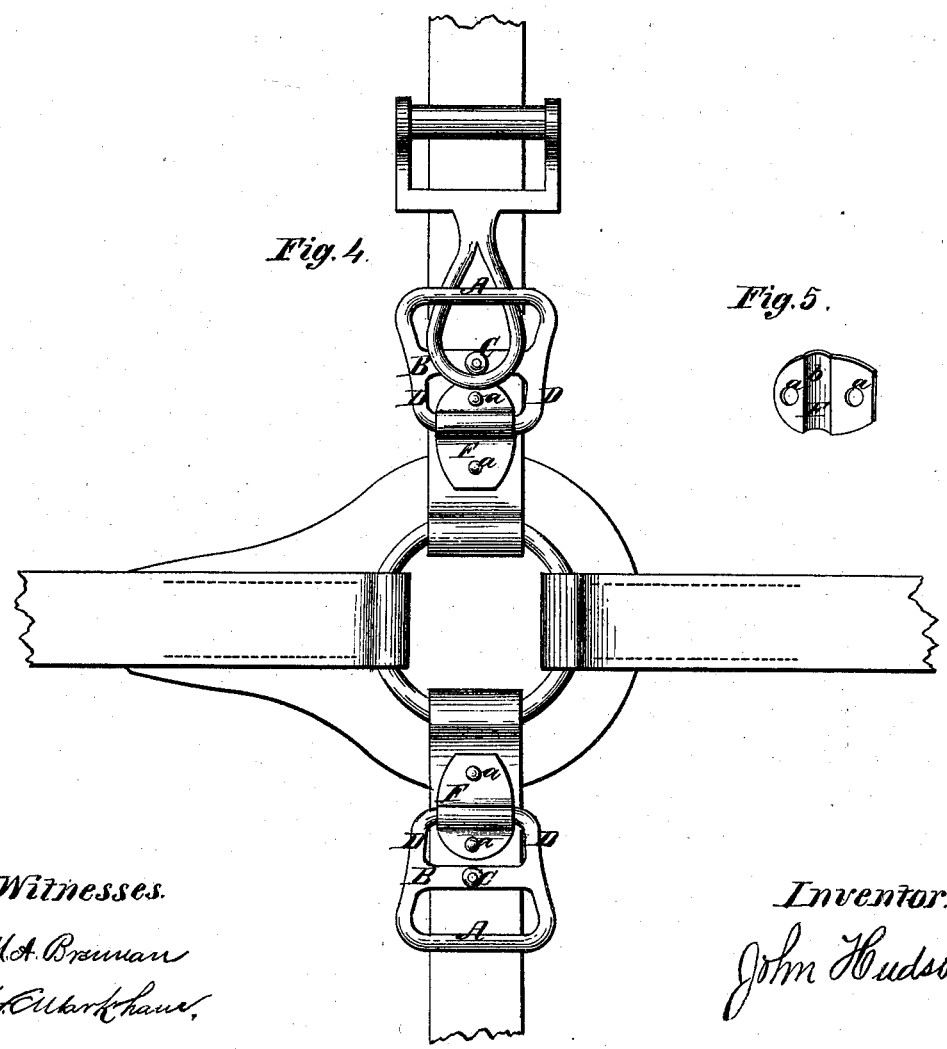
Witnesses.
Inventor.
John Hudson.

UNITED STATES PATENT OFFICE.

JOHN HUDSON, OF DETROIT, MICHIGAN.

IMPROVEMENT IN TRACE-CARRIERS.

Specification forming part of Letters Patent No. 172,022, dated January 11, 1876; application filed November 19, 1875.

*To all whom it may concern:*

Be it known that I, JOHN HUDSON, of the city of Detroit, in the county of Wayne and State of Michigan, have invented an Improvement in Trace-Carrier, of which the following is a specification:

The nature of this invention relates to a new and improved construction of a device for the purpose of carrying the ends of traces on the hips of horses or other draft animals when unhitched from vehicles; and has for its object to obviate the annoyance consequent upon the traces becoming unhooked from ordinary trace-carriers when violently shaken, or when the harness is removed from the horse.

Figure 1 is a perspective view of my improved trace-carrier. Fig. 2 is a plan view of the same, with the plate removed. Fig. 3 is a like view, with the plate in place and attached to the hip-strap of harness by two rivets, thus fastening the overlap at the center ring of crupper without stitching. Fig. 4 is a like view, with cockeye of trace inserted, showing a trace-carrier on each side of crupper-ring, and also showing sections of the crupper and back-strap as they appear when in use. Fig. 5 is a perspective view of the lower side of the plate.

Like letters refer to like parts in each figure.

In the drawings, A represents the front loop of my trace-carrier, which is raised to allow the cockeye of trace to pass under it. B is the center bar, from which projects a stud, C. D represents the two side bars or legs, which extend backward from the center bar. E is the end bar; the whole of the parts A, B, C, D, and E being preferably cast in one piece. F is an oval-shaped plate, with groove *b* across its entire width, as shown, and is provided with holes *a*, designed for riveting firmly to the hip-strap of harness. The groove *b* is designed to fit over the end bar E, thus forming a journal and box.

Two of the complete trace-carriers, as shown in Fig. 4, are required for each horse; one on each side of crupper-ring, being attached to the hip-straps at the aforesaid overlaps by rivets passing through the holes *a* in the plate F. The cockeye of trace passes under the front loop A and over the stud C, as shown in Fig. 4.

What I claim as my invention, and desire to secure by Letters Patent, is—

The combination of the front loop A, the center bar B, the stud C, the side bars D, and the end bar E, of the plate F, having groove *b* and holes *a*, as shown, all as and for the purpose set forth.

In testimony that I claim the above as my invention I have hereunto set my hand this 12th day of November, 1875.

JOHN HUDSON.

Witnesses:
GEORGE E. FROST,
SAML. SLESINGER.